INVENTOR.
ROBERT L. RICHMAN
BY
ATTORNEYS

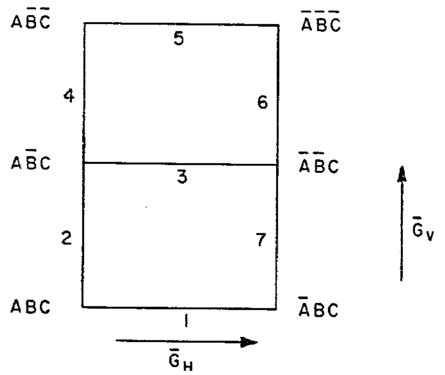
FIG. 2a
| LINE SEGMENT | CODE | BINARY EQUIVALENT OF CODE |
|---|---|---|
| 1 | $ABC\bar{G}_H G_V$ | 11101 |
| 2 | $ABCG_H\bar{G}_V$ | 11110 |
| 3 | $A\bar{B}C\bar{G}_H G_V$ | 10101 |
| 4 | $A\bar{B}CG_H\bar{G}_V$ | 10110 |
| 5 | $A\bar{B}\bar{C}\bar{G}_H G_V$ | 10001 |
| 6 | $\bar{A}\bar{B}CG_H\bar{G}_V$ | 00110 |
| 7 | $\bar{A}BCG_H\bar{G}_V$ | 01110 |
FIG. 2b
FIG. 2c
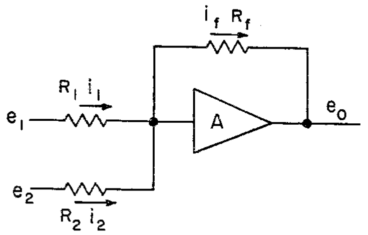
FIG. 3
INVENTOR.
ROBERT L. RICHMAN
BY
ATTORNEYS 3,165,729

CRT DISPLAY SYSTEM HAVING LOGIC CIRCUITS CONTROLLED BY WEIGHTED RESISTORS IN THE DEFLECTION CIRCUITRY

Robert L. Richman, 3726½ Elliot St., San Diego 6, Calif.

Filed July 24, 1961, Ser. No. 126,355
3 Claims. (Cl. 340—324)
(Granted under Title 35, U.S. Code (1952), sec. 266)

The invention described herein may be manufactured and used by or for the Government of the United States of America for governmental purposes without the payment of any royalties thereon or therefor.

This invention relates to a digital display system, and more particularly, to an electronic apparatus for tracing a desired character upon the face of the cathode ray tube by direct control of electron beam of the tube along a path delineating the character.

Although the invention is not necessarily so limited, it is generally concerned with the problem of checking the information stored in a digital computer memory without employing complex circuitry. Such a readout system is used when setting up a computer in that it is necessary that the program be correct, and essentially the readout is utilized in a technique for program "debugging."

The prior systems utilized to check the information stored in a digital computer memory involved complex electronic circuitry and were very expensive. Some of the prior systems utilized preset matrices through which the electron beam was directed while in another preset characters were included in the display system and were energized to generate desired symbols. In brief, the prior art systems utilized intermediate complex circuitry between the computer and cathode ray tube which in turn leads to a complex and expensive readout system.

An object of the present invention is to provide a system for selecting and electronically displaying one or more symbols in visible form.

A further object of the invention is to provide a system for displaying alpha-numeric symbols which are derived from a digital electronic calculating machine.

A further object of the invention is to provide a system for controlling the trace of an electron beam upon the face of a cathode ray tube thereby drawing selected characters thereon.

An additional object of the invention is to provide an electronic display system for creating desired characters upon a display face which utilizes digital information directly.

Another object of the invention is to provide a memory readout system for checking a computer program which utilizes a minimum of circuitry and is very inexpensive to manufacture.

Another object of the invention is to provide a digital display device system for controlling the trace of an electron beam on the face of a cathode ray tube which accepts binary information and converts the information into X and Y deflection voltages which are used to generate Arabic numerals on the cathode ray tube.

Various other objects and advantages will appear from the following description of one embodiment of the invention, and the novel features will be particularly pointed out hereinafter in connection with the appended claims.

FIG. 2(*a*) is an illustration of the block 8 configuration used in generating the symbols;

FIG. 2(*b*) is a table containing the defining binary codes for each line segment of the generated symbols;

FIG. 2(*c*) is an illustration of ten Arabic numerals which can be formed by various combinations of line segments, and FIG. 3 is a schematic diagram of an operational amplifier.

Figure 1:
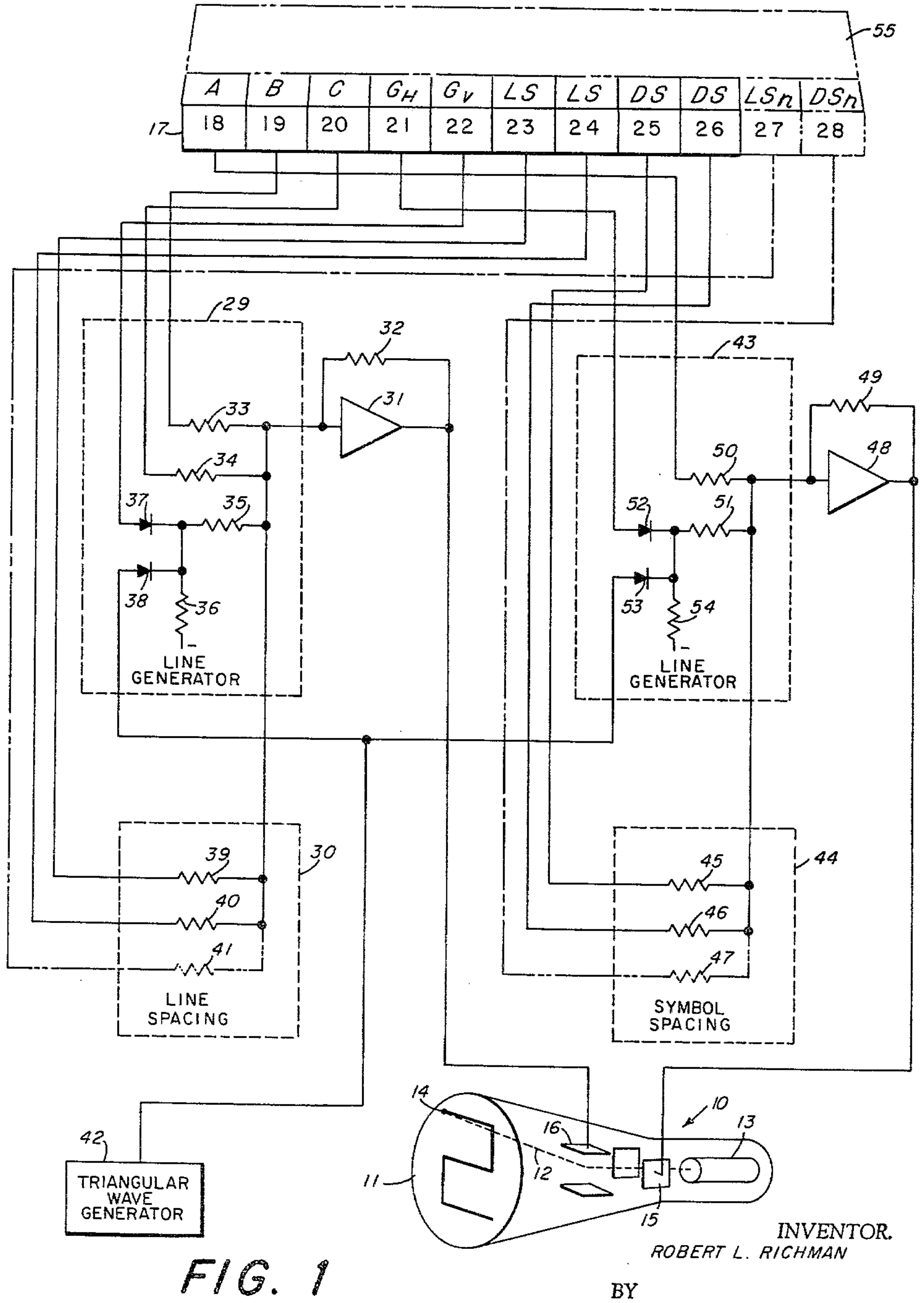
FIG. 1 is a schematic diagram illustrating one embodiment of the present invention.

The above advantages and objects of the present invention are realized in the invention wherein a system is provided which accepts binary information directly from a digital computer, and converts it to X and Y deflection voltages, which are used to control the electron beam of a cathode ray tube thereby generating desired symbols on the face of a cathode ray tube.

In the illustrated embodiment of the invention the Arabic numerals 0 through 9 are to be made available for display, however, the invention has many applications and the number of characters available for display can be extended as desired.

Among the many uses of the present system is as a readout system for providing an instantaneous display of programs or changes in programs which have been inserted into a digital computer.

In the embodiment of the invention illustrated in FIG. 1, the medium chosen for displaying characters is one or more cathode ray tubes 10 capable of tracing characters or symbols upon a face 11. The symbols are drawn by controlling within tube 10 the electron beam 12 issuing from a gun 13 in such a manner as to cause a spot 14 where the beam strikes the tube face 11 to follow a path necessary to delineate a desired character, such as the numeral 2 shown, on the face of the tube 10. The control of the beam may be accomplished in any suitable manner such as by means of the two pairs of electrostatic plates 15 and 16 which are energized in a manner which will be described below.

The energizing voltages originate as digital information stored in a parallel register 17 which may be included in a digital computer 55. The parallel register contains the code at any instant of time which corresponds to the line segment of the symbol to be generated. In order to define the generation of the symbols a code is assigned to the parallel register memory elements comprising 18, 19, 20, 21, 23, 24, 25, 26, 27 and 28 of A, B, C, $G_H$, $G_V$, LS, LS, $LS_n$, DS, DS, and $DS_n$, respectively.

In order to provide vertical control of electron beam 12 the outputs from memory elements 19, 20, and 22 are coupled to line generator 29 while the outputs of memory elements 23, 24, and 27 are coupled to a line space generator 30. Line generator 29 contains an amplitude adder comprising an operational amplifier 31, feedback resistor 32 connected in parallel with the operational amplifier, weighing resistors 33, 34, 35 connected to the input side of the operational amplifier an AND gate coupled to the side of resistor 35 opposite from the input side of operational amplifier 31. The AND gate comprises current limiting resistor 36, and input diodes 37 and 38. The output of memory element 22 is coupled through diode 37 to resistor 35 while the output of a triangular wave generator 42 is coupled through diode 38 to resistor 35.

The line space generator 30 comprises weighting resistors 39, 40 and 41. The outputs from memory elements 19 and 20 are coupled to weighting resistors 33 and 34, respectively, which form two of the inputs to operational amplifier 31. Negative bias for the AND gate is applied through resistor 36 to the common point of diodes 37, 38 and resistor 35.

The output of the operational amplifier 31 is connected to the vertical deflection plate 16 of the oscillograph 10 thereby controlling the path traced by electron beam 12 in the vertical direction.

The means for controlling the horizontal deflection of the electron beam comprises a second line generator 43 and symbol space generator 44. The digit space generator comprises three weighting resistors 45, 46 and 47, which are connected to memory elements 25, 26 and 28, respectively. The other sides of the weighting resistors 45, 46 and 47 are connected as inputs to an operational amplifier 48 contained in line generator 43. Connected across the operational amplifier 48 is a feedback resistor 49 and coupled to the input of operational amplifier 48 are additional weighting resistors 50 and 51. The output of memory element 18 is coupled through weighting resistor 50 to the operational amplifier while the output of memory element 21 is coupled through a diode 52, and thence through the weighting resistor 51 to the input of the operational amplifier 48. Triangular wave generator 42 is coupled through input diode 53 and weighting resistor 51 to the input of operational amplifier 48 also. A source of negative bias for the AND gate consisting of the input diodes 52 and 53 is coupled to the common point of input diodes 52, 53 and weighting resistor 51 through current limiting resistor 54.

The operational amplifiers 31 and 48 are conventional in analogue computers, however, a brief explanation is set forth relative thereto for the purposes of clarifying the operation of the entire amplitude adder comprising the operational amplifier, feedback resistor and weighting resistors. FIG. 3 is a schematic diagram of an amplitude adder comprising an operational amplifier A, feedback resistor $R_f$, and weighting resistors $R_1$ and $R_2$. Voltage levels $e_1$ and $e_2$ are connected as inputs to weighting resistors $R_1$ and $R_2$, respectively, and currents $i_1$ and $i_2$ flow through the resistors $R_1$ and $R_2$, respectively. Current $i_f$ flows through feedback resistor $R_f$ while $e_0$ represents the output of the amplitude adder. The operational amplifier A is a high gain high input impedance amplifier wherein $i_1-i_2=i_f$; therefore, the following relations exist:

$$i_1+i_2=i_f$$

$$\frac{e_1}{R_1}+\frac{e_2}{R_2}=\frac{e_0}{R_f}$$

$$e_1\left(\frac{R_f}{R_1}\right)+e_2\left(\frac{R_f}{R_2}\right)=e_0$$

Therefore, it can be seen that the output of the amplitude adder is determined by weighting factors which in the present case are equal to $$\frac{R_f}{R_1}$$

and $$\frac{R_f}{R_2}$$

Thusly, if the logic levels are 1 and 0, corresponding to zero and −15 volts, respectively and if $e_1$ is −15 volts and $e_2$ −15 volts and $R_1=R_2=R_f$ the output $e_0$ will be a plus 30 volts.

*Operation*

The basic pattern from which the various symbols are derived is shown in FIG. 2(*a*) and corresponds to a block 8 configuration. The pattern is composed of three discrete levels in the vertical direction and two discrete levels in the horizontal direction. All combinations of the levels are completely described by three binary digits; A, B, and C. The line segments, 1–7, connecting the points defined by the levels can also be completely defined by specifying a point in terms of A, B and C as an origin and a directed line segment, $G_H$ in the horizontal direction, or $G_V$ in the vertical direction. All of the line segments can thus be completely described by five binary digits; A, B, C, $G_H$ and $G_V$. FIG. 2 (*b*) illustrates the relationship between the line segment, the code in terms of the five binary digits A, B, C, $G_H$ and $G_V$, and the binary equivalent of the code.

The ten Arabic numerals which are formed by various combinations of line segments have the form shown in FIG. 2(*c*).

The formula for constructing a symbol consists of specifying a sequence of line segments; for example, the formula for the symbol 2 is: 2=1X2X3X5X6; where X means followed in time. In other words, the line segment 1 would be generated, then line segment 2, then line segment 3, and finally line segment 6; or in coded form:

$$2=ABCG_H\overline{G}_V\ X\ ABCG_H\overline{G}_V$$
$$X\ A\overline{B}C\overline{G}_HG_V\ X\ A\overline{BCG}_HG_V\ X\ \overline{AB}CG_H\overline{G}_V$$
$$=11101\ X\ 11110\ X\ 10101\ X\ 10001\ X\ 00110$$

The triangular wave generator is used as one input to the AND gates of the vertical and horizontal line generators in order to generate the line segment from a point, i.e., to scribble a line. It is important that this be a triangular wave generator in that any other waveform would produce an uneven shading of the generated line. For example, let it be assumed that the line segment 1 is being generated. By looking at FIG. 2(*b*) it is seen that the code for line segment 1 is $ABC\overline{G}_HG_V$ which in the binary code corresponds to 11101. Therefore, in that a logic 1 corresponds to zero volts and a logic zero to −15 volts there will be a voltage level of zero volts at weighting resistor 50 and while the input to diode 52 will be a −15 volts. The output of triangular wave generator varies between zero and −15 volts so it can be seen that the AND gate consisting of input diodes 52, 53 and current limiting resistor 54 will generate a voltage level at the input to weighting resistor 51 which varies between zero and −15 volts. This zero to −15 volts level will consequently appear as the input to operational amplifier 48 thereby producing a voltage level varying between zero and a +15 volts at the output of the operational amplifier which is coupled to the horizontal plates 15 of the cathode ray tube 10. In that a line segment 1 corresponds to a horizontal line segment and no vertical deflection is required the inputs to weighting resistors 33, 34 and 35, respectively, are zero volts. The generation of further line segments is not gone into, however, it can easily be seen how the remaining line segments 2 through 7 are generated as the voltage levels at the operational amplifiers are changed in accordance with the binary information in the parallel register 17.

In that the Arabic numerals or symbols are generated sequentially in time it is desirable that the symbols generated be spaced horizontally across the face of the oscillograph and further that the lines of symbols be spaced vertically across the face of oscillograph 10. The horizontal and vertical spacing functions are accomplished through line space generator 30 and digit space generator 44.

When symbols are generated and it is desired to space in the horizontal direction a voltage level is coupled from the parallel register 17 to an appropriate weighting resistor 45, 46 or 47 in the digit space generator 44. In like manner, when it is desired to space the lines of symbols in the vertical direction an appropriate voltage level is coupled from the parallel register 17 to an appropriate weighting resistor 39, 40 or 41.

The weighting resistors contained in the line space generator and digit space generator may be proportioned to produce various increments of line and digit space as desired in that the values of the weighting resistors may be chosen so that a line space or digit space of any size or any desired combination may be had. The same is true of the weighting resistors contained in the line generators for the X and Y deflection in that any deflection may be chosen by changing the value of the input weighting resistor for the particular binary code. In addition, it can be seen that instead of utilizing a technique such as that illustrated, a storage tube might be used to produce a semi-permanent trace of the symbol generated instead of repeated generation of the symbol.

Thus, it is seen that a digital display system is provided which utilizes digital information from the computer directly and requires a minimum of circuit components. The use of conventional circuitry also allows a low cost easily maintained system to be produced.

It will be understood that various changes in the details, materials, steps and arrangements of parts, which have been herein described and illustrated.

What is claimed is:

1. A digital display system for forming symbols comprising; digital storage means for storing digital information bits therein representing horizontal symbol generate information vertical symbol generate information symbol space information line, space information vertical position information and horizontal position information; horizontal amplifier means having an input and output for summing information at the input thereof, weighting resistors operatively coupled to the input of said horizontal amplifier means; logic means operatively coupled to one of said weighting resistors and having at least two input terminals, one of said input terminals of said logic means being coupled to said digital storage device for coupling horizontal symbol generate information from said storage device to said logic means, triangular wave generating means operatively coupled to the other of said input means of said logic means for coupling a triangular waveform to said logic means, other coupling means connected from another of said weighting resistors to said digital storage means for coupling horizontal position information from said digital storage device to said weighting resistor and thereby to the input of said horizontal amplifier so that the output from said horizontal amplifier represents horizontal position information and horizontal symbol generate information; vertical amplifier means having an input and output for summing voltages coupled to the input thereof, vertical weighting resistors operatively connected to the input of said vertical amplifier means, vertical logic means operatively connected to one of said weighting resistors and having at least two input elements, one of said input elements operatively connected to said digital storage means so that vertical symbol generate information is coupled to said input of said vertical logic means, triangular wave generator means operatively coupled to the other of said logic means inputs for coupling a triangular waveform thereto; another of said vertical weighting resistors being operatively coupled to said digital storage means for coupling vertical symbol position information to the input of said vertical amplifier means so that the output of said vertical amplifier means is representative of vertical position information and vertical symbol generate information; display means utilizing an electron beam for displaying information thereon and having vertical and horizontal beam deflection means; horizontal conducting means operatively connected between the output of the horizontal amplifier means and said horizontal beam deflection means for coupling the output of said horizontal amplifier to said horizontal beam deflection means thereby causing said electron beam to be moved and positioned horizontally in accordance with the output of said horizontal amplifier means; and vertical conducting means operative connecting said vertical amplifier means to said vertical beam deflection means so that the electron beam is positioned and moved vertically in accordance with the output of said vertical amplifier means.

2. A digital display system as set forth in claim 1 and further including another of said weighting resistors coupled between the input of said horizontal amplifier means and said digital storage means for coupling symbol space information from said digital storage device to the input of said horizontal amplifier so that when symbols are generated on said display means the symbols are spaced apart horizontally.

3. A digital display system as set forth in claim 2 and further including; another of said weighting resistors operatively connected between said digital storage means and the input of said vertical amplifier means for coupling line space information from said digital storage means to the input of said vertical amplifier so that when symbols are displayed on said display device the symbols are spaced vertically.

References Cited by the Examiner

UNITED STATES PATENTS

| | | | |
|---|---|---|---|
| 2,578,970 | 12/51 | Gannaway | 340—324.1 |
| 2,594,731 | 4/52 | Connolly | 340—324.1 |
| 2,766,444 | 10/56 | Sheftelman | 340—138 X |
| 2,858,475 | 10/58 | Blake | 340—324.1 |
| 2,875,951 | 3/59 | Schreiner | 340—324.1 |
| 2,889,547 | 6/59 | Wesley | 340—324.1 |
| 2,931,022 | 3/60 | Triest | 340—324.1 |
| 2,942,251 | 6/60 | Shanahan | 340—324.1 |
| 2,976,529 | 3/61 | McNaney | 315—26 X |
| 3,020,441 | 2/62 | Hamann | 315—26 X |
| 3,047,851 | 7/62 | Palmiter | 340—324.1 |
| 3,090,041 | 5/63 | Dell | 340—324.1 |

OTHER REFERENCES

Publication: Proceedings of the I.R.E., "Computer Generated Displays," T. T. Loewe, January 1961, pp. 185–195 relied on.

NEIL C. READ, *Primary Examiner.*

JOHN H. BURNS, *Examiner.*